US012116171B2

(12) United States Patent
Ross

(10) Patent No.: US 12,116,171 B2
(45) Date of Patent: Oct. 15, 2024

(54) RECLOSABLE BAG AND METHOD TO MAKE SAME

(71) Applicant: Poly-America, L.P., Grand Prairie, TX (US)

(72) Inventor: Michael A Ross, Eden Prairie, MN (US)

(73) Assignee: Poly-America, L.P., Grand Prairie, TX (US)

( * ) Notice: Subject to any disclaimer, the term of this patent is extended or adjusted under 35 U.S.C. 154(b) by 84 days.

(21) Appl. No.: 17/960,941

(22) Filed: Oct. 6, 2022

(65) Prior Publication Data

US 2023/0035719 A1 Feb. 2, 2023

Related U.S. Application Data

(63) Continuation of application No. 16/535,915, filed on Aug. 8, 2019, now Pat. No. 11,492,178, which is a continuation of application No. 14/969,259, filed on Dec. 15, 2015, now Pat. No. 10,421,584, which is a continuation-in-part of application No. 14/956,628, filed on Dec. 2, 2015, now abandoned.

(51) Int. Cl.

| | |
|---|---|
| ***B65D 33/08*** | (2006.01) |
| ***B65D 33/25*** | (2006.01) |
| *B31B 70/86* | (2017.01) |
| *B31B 155/00* | (2017.01) |
| *B31B 160/20* | (2017.01) |
| *B65D 30/20* | (2006.01) |

(52) U.S. Cl.

CPC ......... *B65D 33/08* (2013.01); *B65D 33/2508* (2013.01); *B31B 70/872* (2017.08); *B31B 2155/00* (2017.08); *B31B 2155/003* (2017.08); *B31B 2160/20* (2017.08); *B65D 31/10* (2013.01)

(58) Field of Classification Search

CPC .... B65D 33/08; B65D 31/10; B31B 2155/00; B31B 70/872; B31B 2155/003

USPC .......................................................... 493/221

See application file for complete search history.

(56) References Cited

U.S. PATENT DOCUMENTS

| | | | | | |
|---|---|---|---|---|---|
| 5,112,138 | A * | 5/1992 | Peppiatt | B65D 33/10 | 383/203 |
| 6,345,911 | B1 * | 2/2002 | Young | B65D 33/10 | 383/44 |
| 2011/0015052 | A1 * | 1/2011 | Totani | B65D 31/08 | 493/243 |
| 2014/0241847 | A1 * | 8/2014 | Short | B65D 33/08 | 414/800 |

* cited by examiner

*Primary Examiner* — Robert F Long
*Assistant Examiner* — Xavier A Madison
(74) *Attorney, Agent, or Firm* — Daniel J. Layden

(57) ABSTRACT

The present invention relates to improvements for shopping and merchandise bags with integral handles. Disclosed is a bag with integral handles and closure elements located below the integral handles. Further disclosed is a process for manufacturing a reclosable bag with integral handles. The handles and bag may be formed from a wave-cut polymeric tube. In addition, the handles of the bag may be formed from a wave-cut polymeric tube while the body of the bag is formed from a side-gusseted polymeric tube. The disclosed bags and methods to make such bags provide cost effective solutions for providing reclosable bags with integral handles.

19 Claims, 12 Drawing Sheets

RECLOSABLE BAG AND METHOD TO MAKE SAME

CROSS-REFERENCE TO RELATED APPLICATIONS

Figure 1:
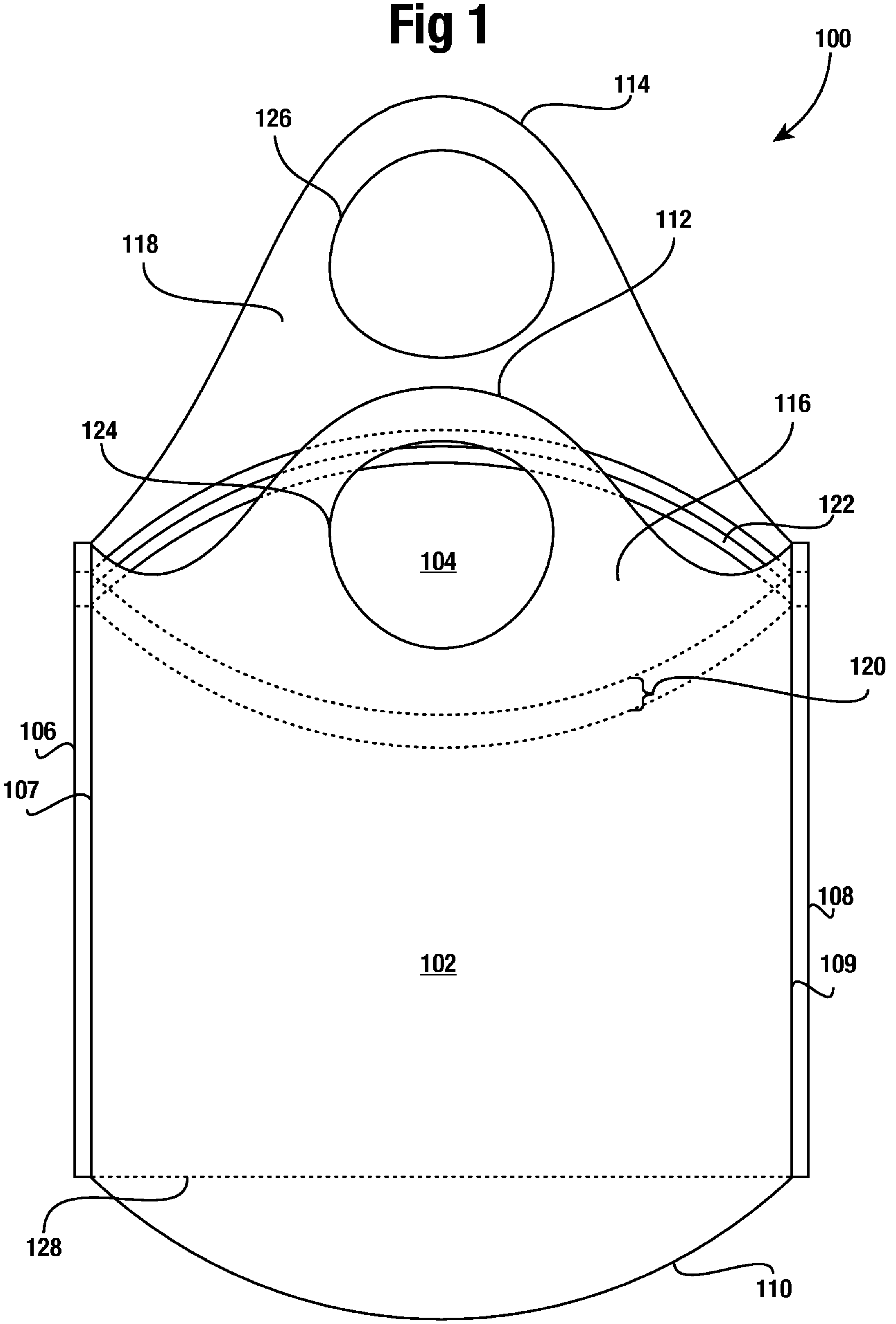

This application is a continuation of application Ser. No. 16/535,915, filed Aug. 8, 2019, which is a continuation of application Ser. No. 14/969,259, filed Dec. 15, 2015, now U.S. Pat. No. 10,421,584, which is a continuation-in-part of application Ser. No. 14/956,628, filed Dec. 2, 2015. These three aforementioned applications are hereby incorporated by reference into this disclosure.

BACKGROUND OF THE INVENTION

1. Field of the Invention

The present invention relates to an improved merchandise or shopping bag with an integral handle and reclosable feature. Particularly, the present invention relates to a bag with integral handles which includes a closure mechanism with male and female closure elements that is adapted for high speed and cost effective manufacturing.

2. Description of the Related Art

Thermoplastic films are used in a variety of applications. For example, thermoplastic films are used in sheet form for applications such as drop cloths, vapor barriers, and protective covers. Thermoplastic films can also be converted into plastic bags, which may be used in a myriad of applications. The present invention is particularly useful for bags constructed from thermoplastic film.

Polymeric bags are ubiquitous in modern society and are available in countless combinations of varying capacities, thicknesses, dimensions, and colors. The bags are available for numerous applications including typical consumer applications such as long-term storage, food storage, shopping, and trash collection. Like many other consumer products, increased demand and new technology have driven innovations in polymeric bags improving the utility and performance of such bags. The present invention is an innovation of particular relevance to food storage bags.

Polymeric bags are manufactured from polymeric film produced using one of several manufacturing techniques well-known in the art. The two most common methods for manufacture of polymeric films are blown-film extrusion and cast-film extrusion. In blown-film extrusion, the resulting film is tubular while cast-film extrusion produces a generally planar film. The present invention is generally applicable to bags manufactured from a blown-film extrusion process resulting in tubular film stock.

In blown film extrusion, polymeric resin is fed into an extruder where an extrusion screw pushes the resin through the extruder. The extrusion screw compresses the resin, heating the resin into a molten state under high pressure. The molten, pressurized resin is fed through a blown film extrusion die having an annular opening. As the molten material is pushed into and through the extrusion die, a polymeric film tube emerges from the outlet of the extrusion die.

The polymeric film tube is blown or expanded to a larger diameter by providing a volume of air within the interior of the polymeric film tube. The combination of the volume of air and the polymeric film tube is commonly referred to as a bubble between the extrusion die and a set of nip rollers. As the polymeric film tube cools travelling upward toward the nip rollers, the polymeric film tube solidifies from a molten state to a solid state after it expands to its final diameter and thickness. Once the polymeric film tube is completely solidified, it passes through the set of nip rollers and is collapsed into a collapsed polymeric tube, also referred to as a collapsed bubble.

One common method of manufacturing polymeric bags involves segregating the collapsed polymeric tube into individual trash bags by forming seals which extend transversely across the entire width of the tube with each seal forming the bottom of a bag. Typically, a line of perforations is formed immediately adjacent and parallel to each seal to facilitate separation of the trash bags one from another. The opening of the perforations then forms the top of a bag and opposing edges of the collapsed polymeric tube then form the opposing sides of a bag.

It is known to provide wave-cut bags by a continuous multi-bag manufacturing process from a collapsed bubble or tube. The collapsed bubble may be slit through both a front and back of the bubble with a repeating waveform pattern. Repeating evenly spaced pairs of transverse heat seals may be placed on both halves of the slit bubble to define left and right side edges of each bag. In between each pair of heat seals a perforation or cut line may be placed so that the formed bags may be separated. The slit middle of the collapsed bubble forms the top of the bag and one of the two opposing edges of the collapsed bubble forms the bottom of the bag.

The lobe-shaped features, or lobes, of wave-cut bags can have holes punched out or otherwise provided in the middle of the lobe to provide a convenient handle for the user to carry the bag. Unfortunately, if only a single lobe is provided on each side of the bag it is difficult to close the bag and if the lobes are used to tie the bag then the lobes no longer function as handles since their length is taken up in a knot. Hence, it would be useful to provide a cost-effective means to close the bag while still maintaining use of the bag's handles. Providing a means to reclose the bag also allows the bag to be repurposed as a storage bag after being used as a merchandise or shopping bag.

U.S. Pat. No. 4,125,220 (the '220 patent), filed Dec. 2, 1977 and hereby incorporated by reference, discloses a wave-cut shopping bag with a sinusoid waveform defining a top handle of the shopping bag. A width of the bag is disclosed as equal to a single wavelength with a hole or handle opening centered vertically on the base line of the wavelength and centered horizontally at the peak of the waveform. The '220 patent, however, fails to disclose any convenient means to close the bag.

Reclosable plastic bags are well-known in the art and are available in a variety of different sizes and configurations. Most commonly, reclosable plastic bags have one or more pairs of opposing, interlocking closures near the top opening of the reclosable bag. The closure may generally be opened and closed many times and are typically designed to ensure that the contents of the reclosable plastic bag are securely contained within the bag when the opposing closures are mutually engaged.

The closures of reclosable bags can be opened and closed in a number of different ways. For example, a slider or zipper device can be incorporated into the bag design to facilitate engagement and disengagement of the opposing closures. However, many reclosable bags have closures that are designed to be opened by physically pulling the closures apart and closed by pressing the closures together along the length of the closure. These bags may commonly be referred to as press to close reclosable bags.

U.S. Pat. No. 3,402,749 (the '749 patent), filed on Mar. 10, 1967 and hereby incorporated by reference, discloses a plastic film shopping bag with a reclosable zipper device and hand holes formed in integral flanges above the reclosable zipper device. However, the '749 patent relies upon straight cut upper flanges for handles which provides a difficult to grasp handle and fails to efficiently utilize material for forming the bag and its corresponding handles.

U.S. Pat. No. 4,165,832 (the '832 patent), filed on Jul. 10, 1978 and hereby incorporated by reference, discloses a side-gusseted shopping bag formed from a side-gusseted collapsed polymeric tube. Such bags are commonly referred to as "t-shirt" bags. The '832 patent discloses bags with integral handles but fails to disclose any means of closing the bag without the use of the bag's handles.

In consideration of the shortcomings of the above discussed prior art, it would be desirable to provide a merchandise or shopping bag having an integral handle and a reclosable opening. It would further be desirable to provide such a bag that takes advantage of high speed manufacturing processes and efficiently utilizes material. The present invention represents a novel solution to address these needs.

SUMMARY OF THE INVENTION

According to one embodiment of the present invention, a bag is formed from a collapsed tube of polymeric film. The bag may comprise a first panel and a second panel. The first panel and the second panel may be joined at a first side edge by a first side seal, at a second side edge by a second side seal, and at a bottom edge. The bottom edge may be defined by a first edge of the collapsed tube. The first panel may have a first top edge opposite the bottom edge and the second panel may likewise have a second top edge opposite the bottom edge. The first top edge and second top edge may define an opening of the bag. The first top edge and the second top edge may have a wave-shaped profile and the wave-shaped profile may define a lobe in the first panel and a lobe in the second panel. A first closure element may be disposed on an interior of the first panel and extend generally from the first side edge to the second side edge. The first closure element may be located below the wave-shaped profile of the first top edge. A second closure element may be disposed on an interior of the second panel opposite from the first closure element and extend generally from the first side edge to the second side edge. The second closure element may be located below the wave-shaped profile of the second top edge.

In certain embodiments of the present invention, a peak of the wave-shaped profile of both the first top edge and second top edge may be located generally equidistant from the first side edge and the second side edge. A circular opening may be defined centrally within each lobe of the first and second panels. The circular opening may be located equidistant from the first side edge and the second side edge. A gusset may also be defined within the bottom edge of the bag. The first and second closure elements may comprise male and female closure elements and the first and second closure elements may be affixed to the first and second panels by one or more heat seals. In an alternative embodiment, the first and second closure elements may be affixed to the first and second panels by a pressure sensitive adhesive.

In a further embodiment of the present invention, a polymeric bag may be formed from a continuous polymeric film tube. The polymeric film tube may be collapsed to form a collapsed tube. Prior to collapsing the polymeric film tube, a gusset may be formed within a first side and an opposing second side of the polymeric film tube. The collapsed tube may have front and rear sections, opposing first and second folded edges, and a machine direction. The collapsed tube may be slit in a repeating waveform through the front and rear sections of the collapsed tube in the machine direction. The slitting of the collapsed tube may result in a plurality of lobes with the waveform centered between the first and second folded edges. A central opening may be formed within each of the plurality of lobes. The slitting may further result in first and second tube sections with the first and second tube sections having front and rear sections. A distal end of the front section of the first tube section may be separated from a distal end of the rear section of the first tube section. A first closure element may be affixed to an interior of the front section of the first tube section with the first closure element extending generally in the machine direction. A second closure element may be affixed to an interior of the rear section of the first tube section with the second closure element also extending generally in the machine direction. The first tube section may then be formed into a plurality of bags.

The plurality of bags may be formed by sets of closely spaced, parallel seals that extend transversely across a width of the first tube section. Perforations may also be formed that extend transversely across the width of the first tube section with a perforation between and parallel with each set of parallel seals. Each waveform may have a plurality of peaks and bases with each set of parallel seals centered at each base so that each peak of the waveform is centered in the machine direction between sets of parallel seals. In an alternate preferred embodiment, a plurality of side seals may be formed with each side seal extending transversely across a width of the first tube section at each base of the wave-shape profile. Simultaneously with the formation of each side seal, the first tube section may be cut through about or within each side seal.

In at least one embodiment, the first closure element may be affixed to the front section of the first tube section with one or more heat seals and the second closure element may be affixed to the rear section of the first tube section with one or more heat seals. In an alternative embodiment, the first closure element may be affixed to the front section of the first tube section with a pressure sensitive adhesive and the second closure element may likewise be affixed to the rear section of the first tube section with a pressure sensitive adhesive. The first and second closure elements may be comprised of male and female closure elements. The first and second closure elements may also be comprised of interlocking press to close closure elements. Additionally, the first closure element may be interlocked with the second closure element.

According to a further embodiment of the present invention, a bag can be formed from polymeric blown film. The bag may comprise a front panel and a rear panel with each panel having a first side, a second side, an upper edge, and a bottom edge. The bag may also comprise a front handle and a rear handle with each handle having first side, a second side, a bottom edge and an upper edge. The front and rear handle upper edges may define an opening of the bag and the front and rear panel may be joined at the bottom edge. The front handle may be sealed to the front panel by a front handle seal and the front handle seal may extend from the first side to the second side of the front handle. The front panel seal may also be adjacent to the front panel upper edge and front handle bottom edge. The rear handle may be sealed to the rear panel by a rear handle seal. The rear handle seal may extend from the first side to the second side of the rear handle. The rear panel seal may be adjacent to the rear panel upper edge and rear handle bottom edge.

In the same embodiment, a pair of opposing side gusset panels may be joined to and between the front panel and rear panel. Furthermore, each of the front and rear handle upper edges may have a wave-shaped profile and the wave-shaped profile may define a lobe in each of the front and rear handles. A first closure element may be disposed on an interior of the front handle and extend generally from the first side to the second side of the front handle. The first closure element may be located between the wave-shaped profile and the front handle seal. A second closure element may be disposed on an interior of the rear handle opposite from the first closure element and extend generally from the first side to the second side of the rear handle. The second closure element may be located between the wave-shaped profile and the rear handle seal.

In an additional embodiment of the present invention, a bag may be formed from polymeric blown film. A side-gusseted tube may be formed with a first machine direction. The side-gusseted tube may be collapsed to define a front side and a rear side with both the front and rear sides having leading distal edges. A partial wave-cut tube with a second machine direction may be formed and collapsed to define a front side and a rear side. The front and rear sides of the partial wave-cut tube may each have a first side edge with a wave-cut profile and an opposing second side edge. Each second side edge of the partial wave-cut tube be may extend generally linearly in the second machine direction. The side-gusseted tube may intersect with the partial wave-cut tube and the first machine direction may be arranged generally perpendicular to the second machine direction. The leading distal edges of the side-gusseted tube may be placed adjacent to the second side edges of the partial wave-cut tube. The front side leading distal edge may be sealed to the front side second side edge and the rear side leading distal edge may be sealed to the rear side second side edge. A bottom seal may be formed in the side-gusseted tube and opposing side seals in the partial wave-cut tube to define a bottom and side edges of the bag. The bag may be severed from the side-gusseted tube and the partial wave-cut tube.

In certain embodiments, the bottom seal may be formed generally perpendicular to the machine direction of the side-gusseted tube and generally parallel to the partial wave-cut tube. The side-gusseted tube may have a pair of inwardly folded opposing side gussets between the front side and rear side. A first closure element may be affixed to an interior of the front side of the partial wave-cut tube and a second closure element may be affixed to an interior of the rear side of the partial wave-cut tube.

It is contemplated that the present invention may be utilized in ways that are not fully described or set forth herein. The present invention is intended to encompass these additional uses to the extent such uses are not contradicted by the appended claims. Therefore, the present invention should be given the broadest reasonable interpretation in view of the present disclosure, the accompanying figures, and the appended claims.

BRIEF DESCRIPTION OF THE RELATED DRAWINGS

A full and complete understanding of the present invention may be obtained by reference to the detailed description of the present invention and the preferred embodiments when viewed with reference to the accompanying drawings. The drawings can be briefly described as follows.

FIG. 1 provides a perspective view of a reclosable bag as contemplated by one embodiment of the present invention.

Figure 2:
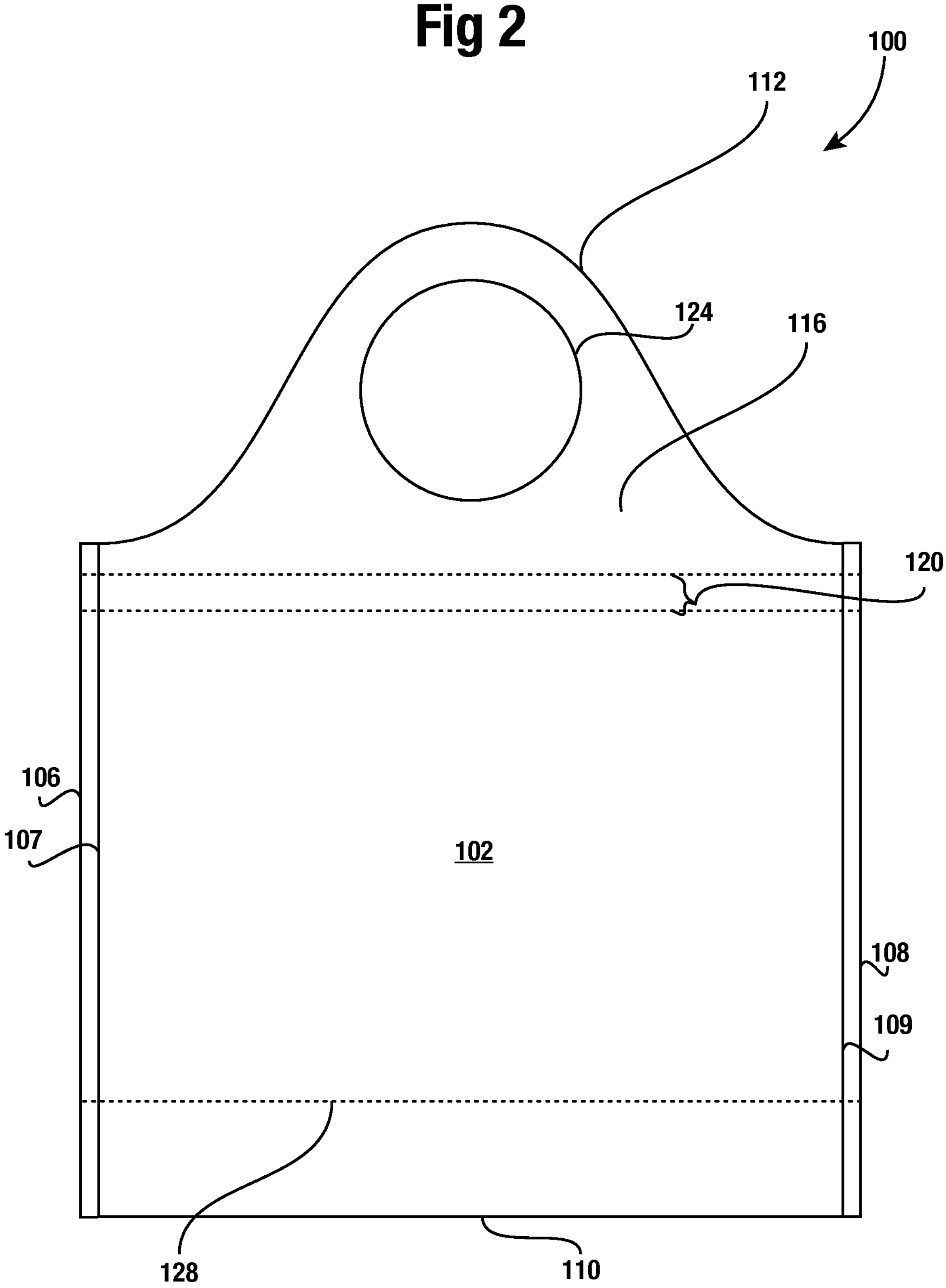

FIG. 2 provides a front view of the reclosable bag of the embodiment of FIG. 1.

Figure 3:
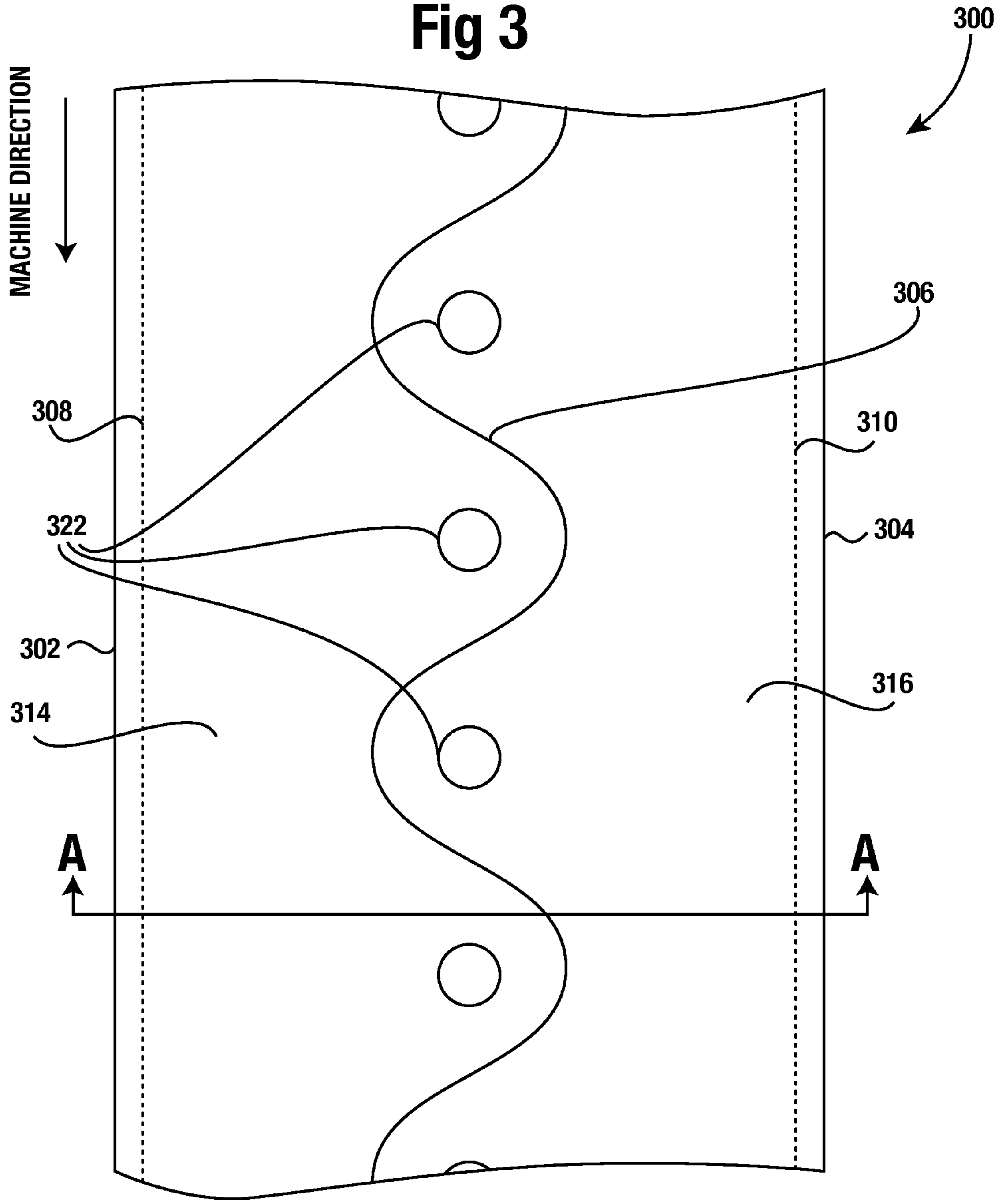

FIG. 3 provides a top view of a collapsed polymeric tube utilized in a method to form the bag of FIGS. 1 and 2.

Figure 4:
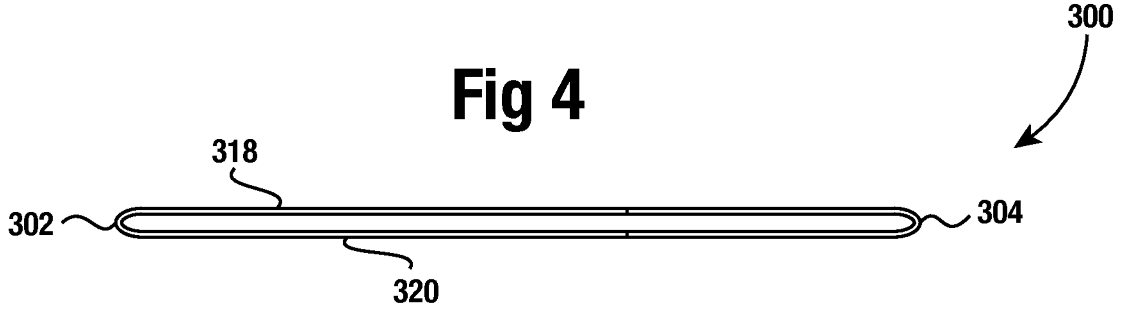

FIG. 4 provides a cross-sectional view of the collapsed polymeric tube of FIG. 3 taken along line A-A with the material thickness exaggerated for purposes of clarity.

Figure 5:
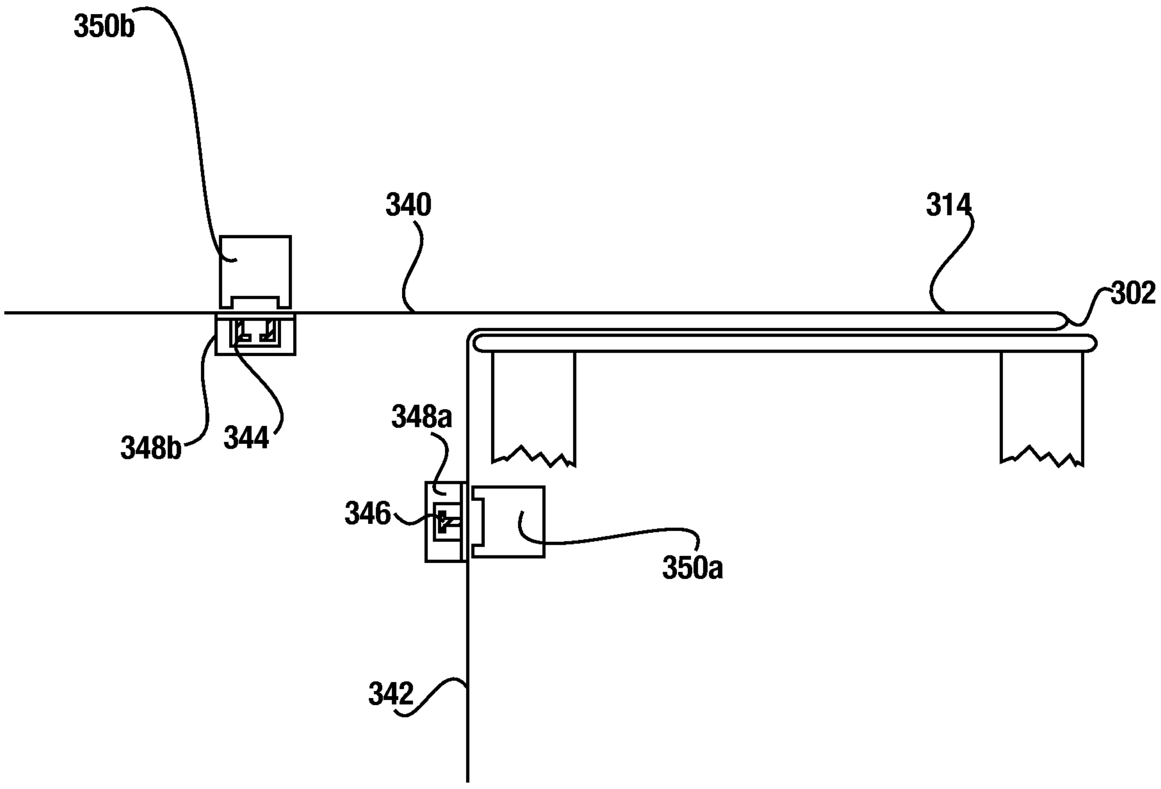

FIG. 5 provides a side view of a manufacturing apparatus according to the method to form the bag of FIGS. 1 and 2 with a first tube section of the collapsed polymeric tube of FIG. 3 shown in cross-section.

Figure 6A:
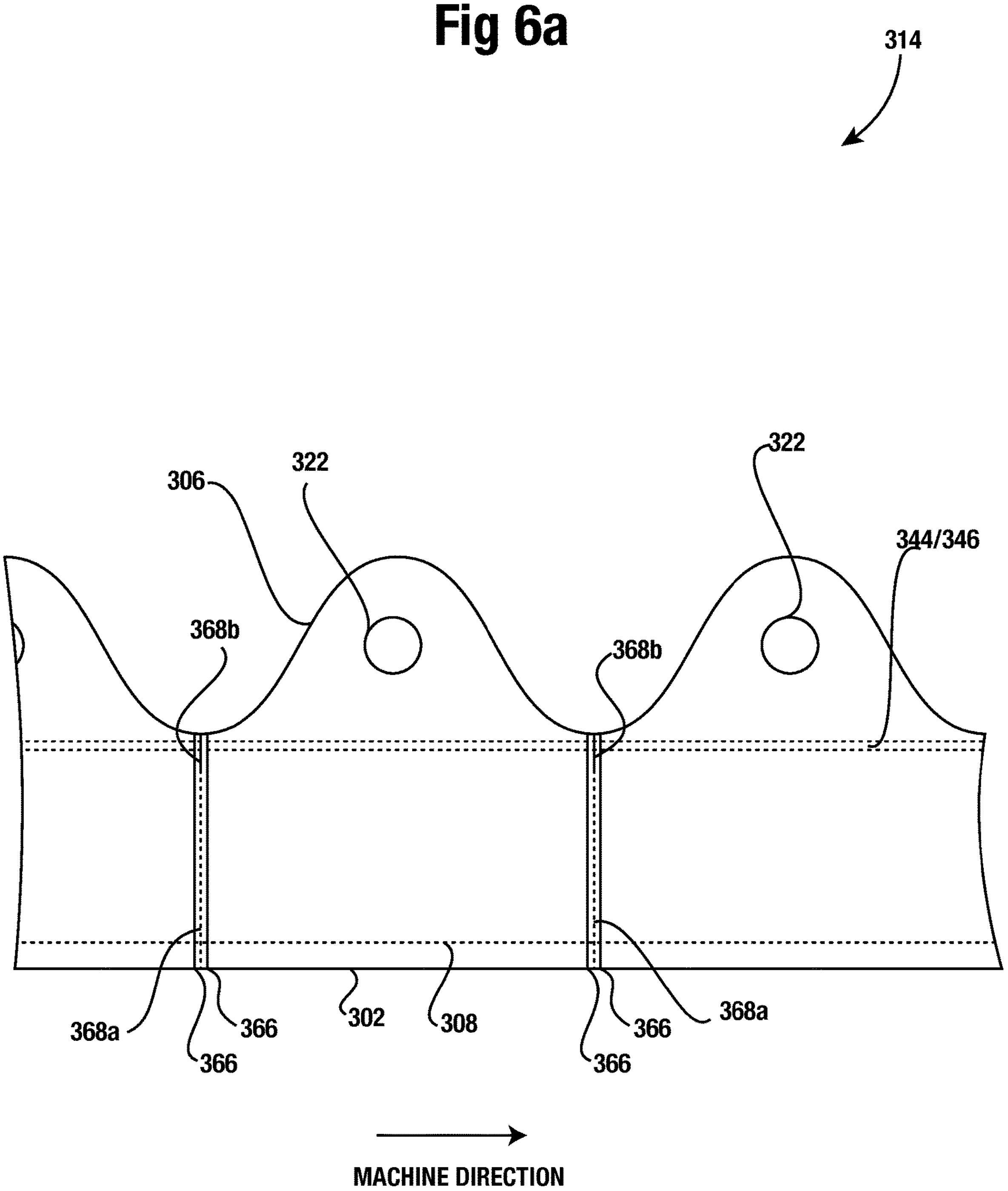

FIG. 6*a* provides a top view of the first tube section of the collapsed polymeric tube of FIG. 3.

Figure 6B:
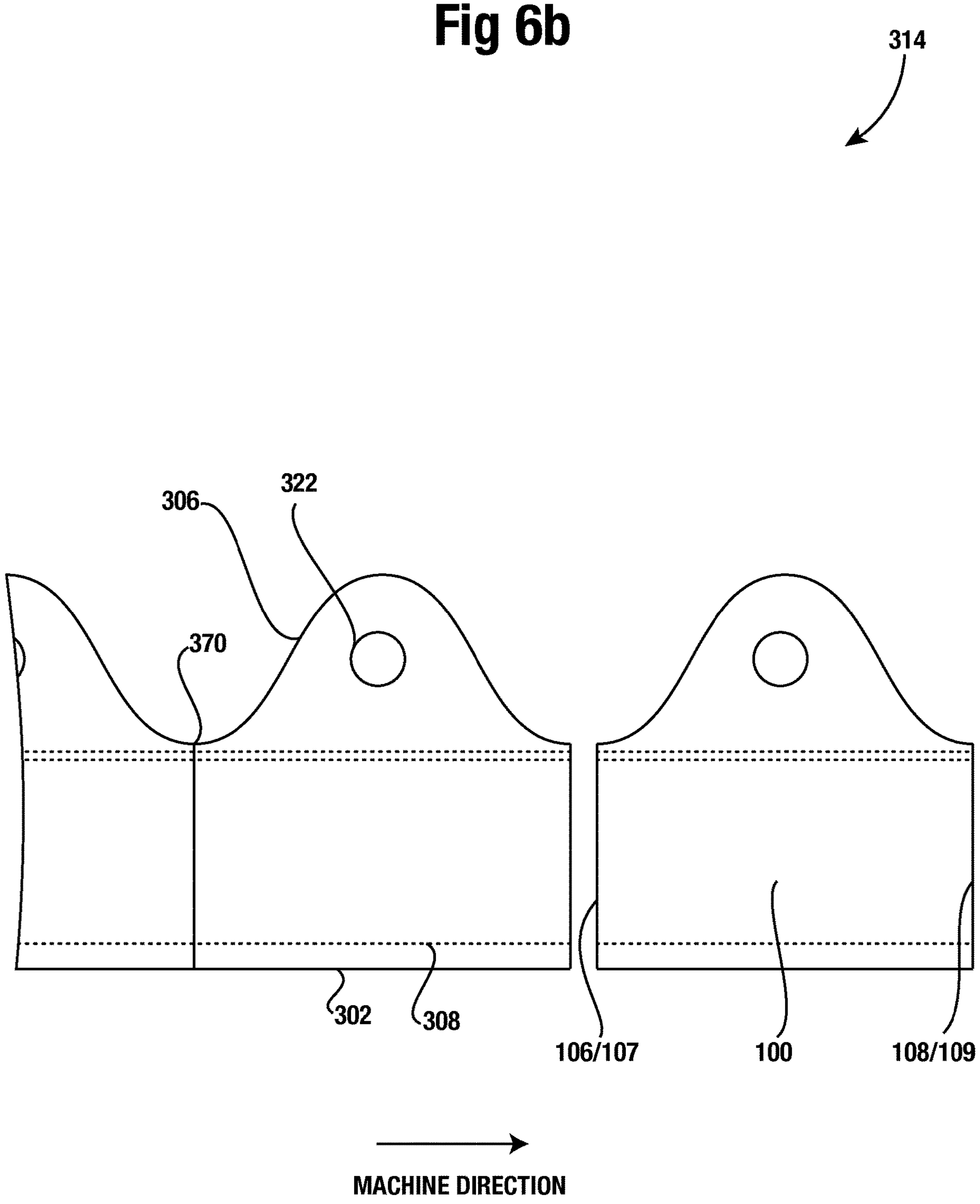

FIG. 6*b* provides another top view of an alternative embodiment of the first tube section of FIG. 3.

Figure 7:
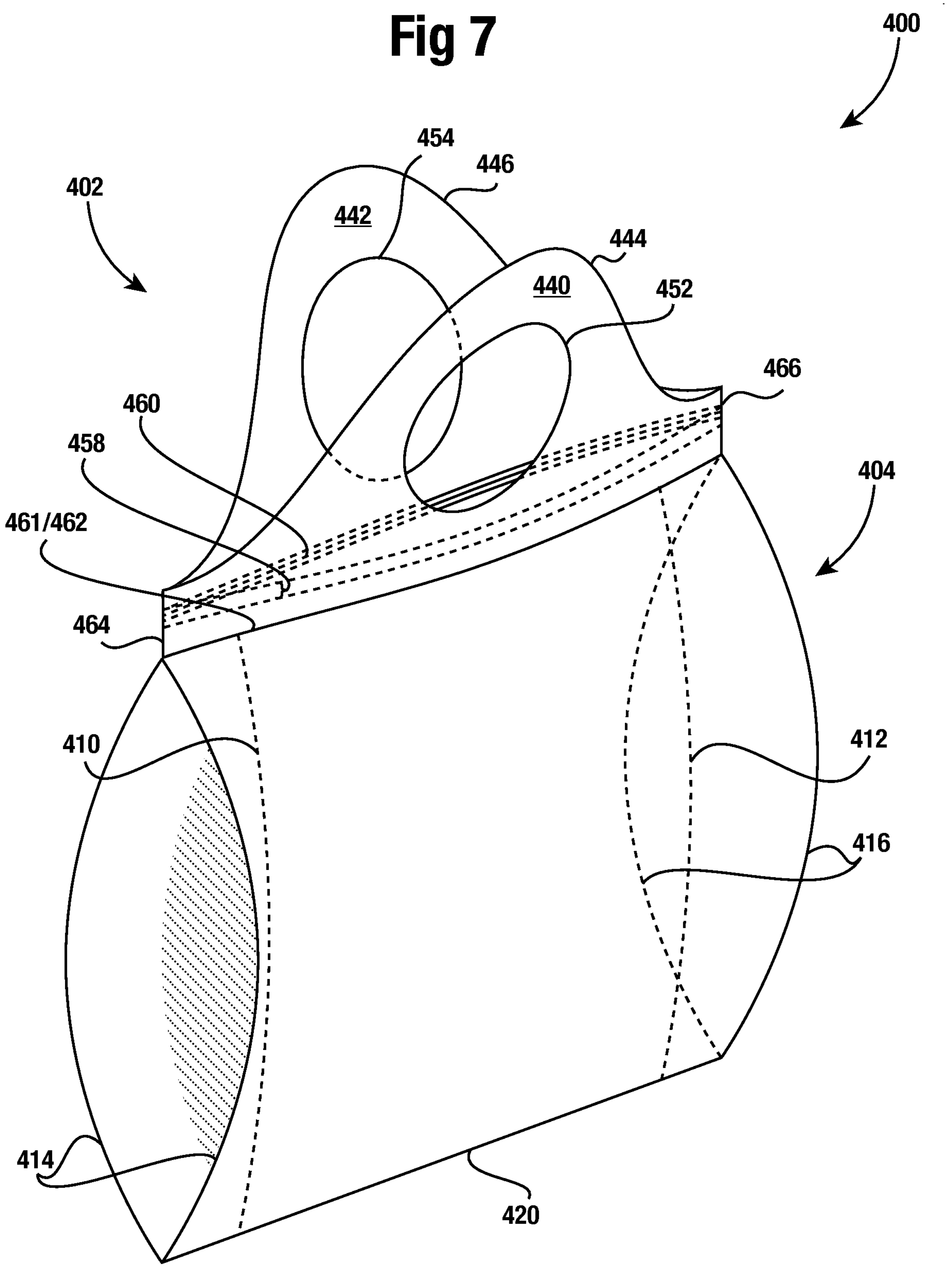

FIG. 7 provides a front perspective view of an additional embodiment of a reclosable bag contemplated by the invention.

Figure 8:
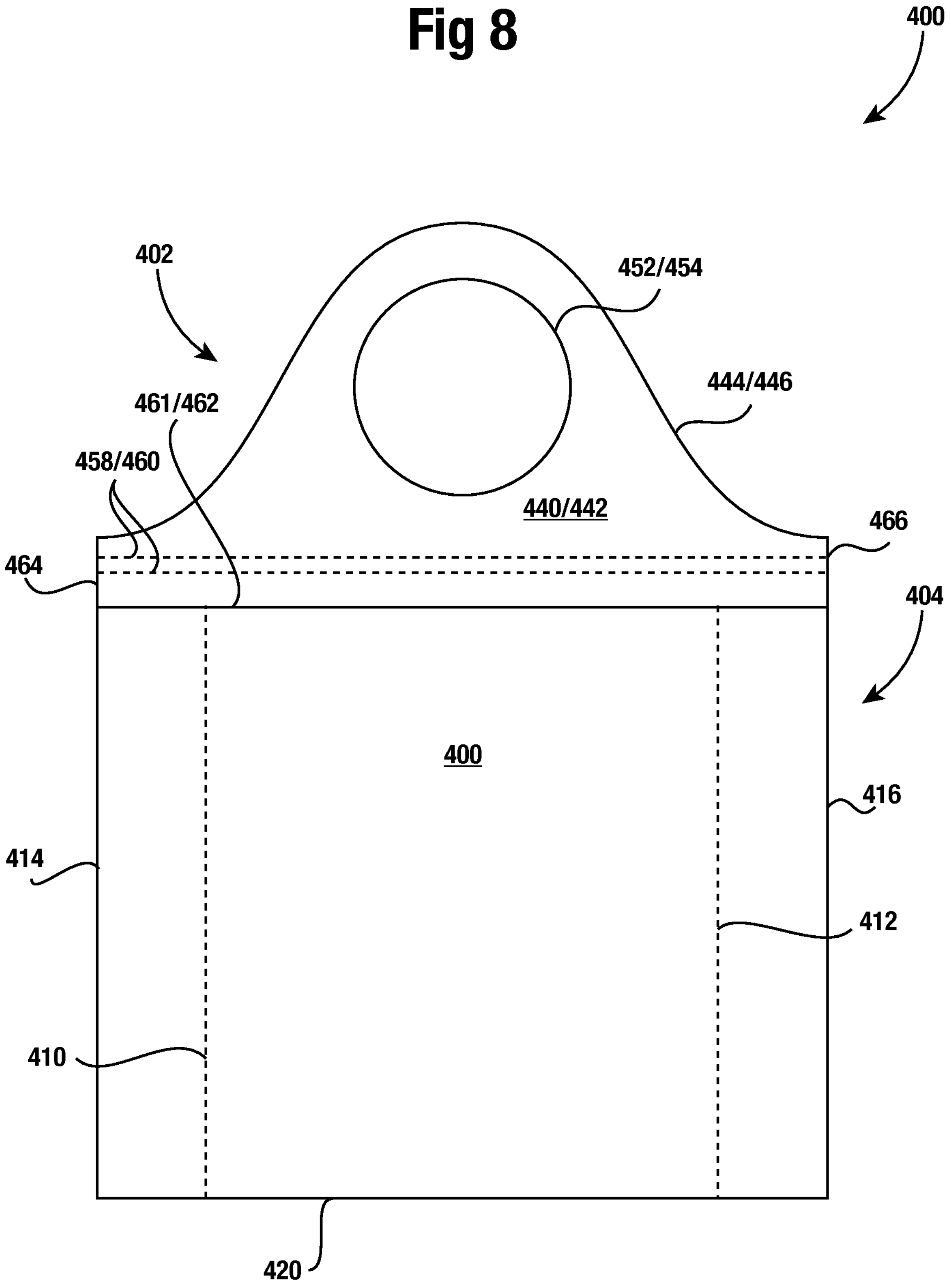

FIG. 8 provides a front plan view of the reclosable bag of the embodiment of FIG. 7.

Figure 9:
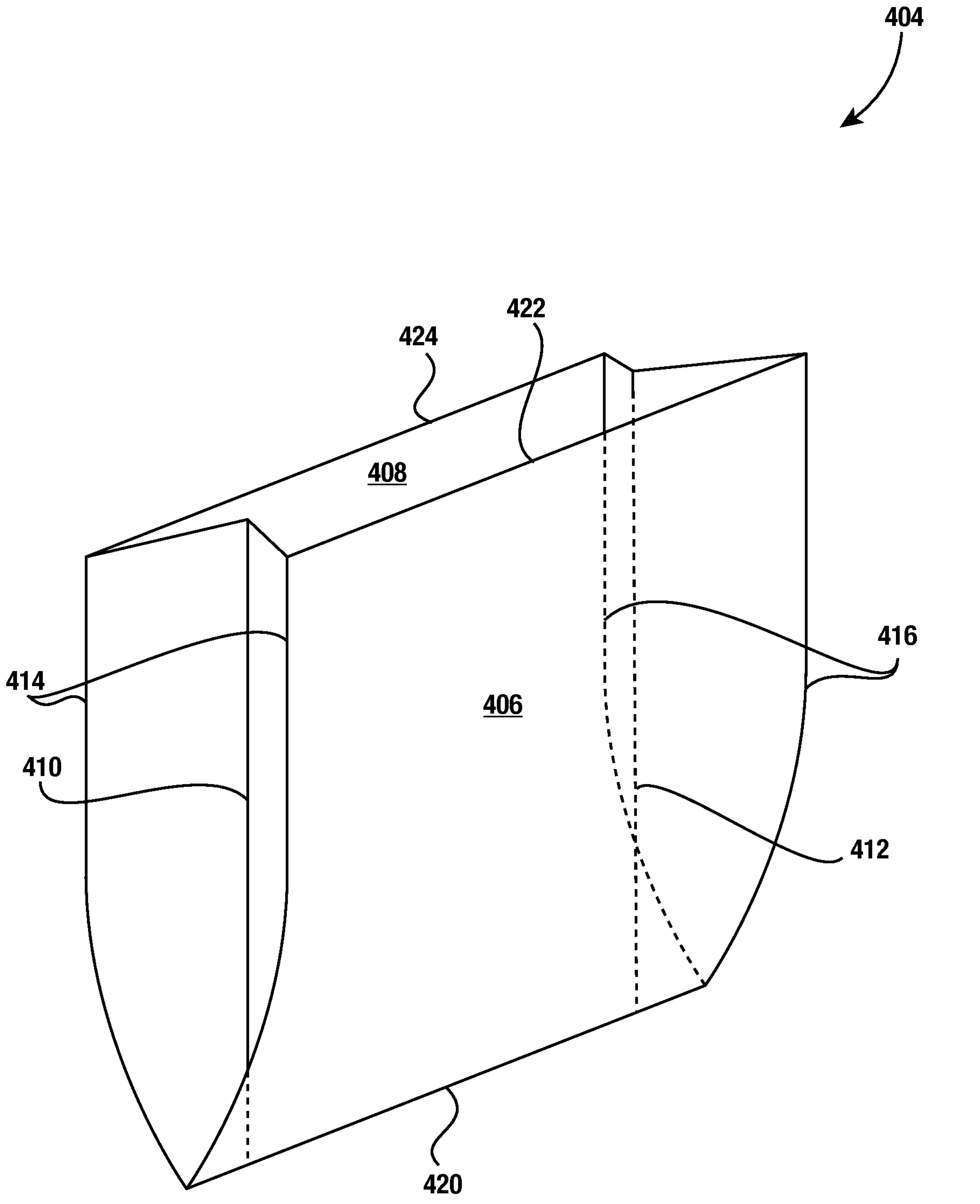

FIG. 9 provides a front perspective view of a bag body of the reclosable bag of the embodiment of FIGS. 7 and 8.

Figure 10:
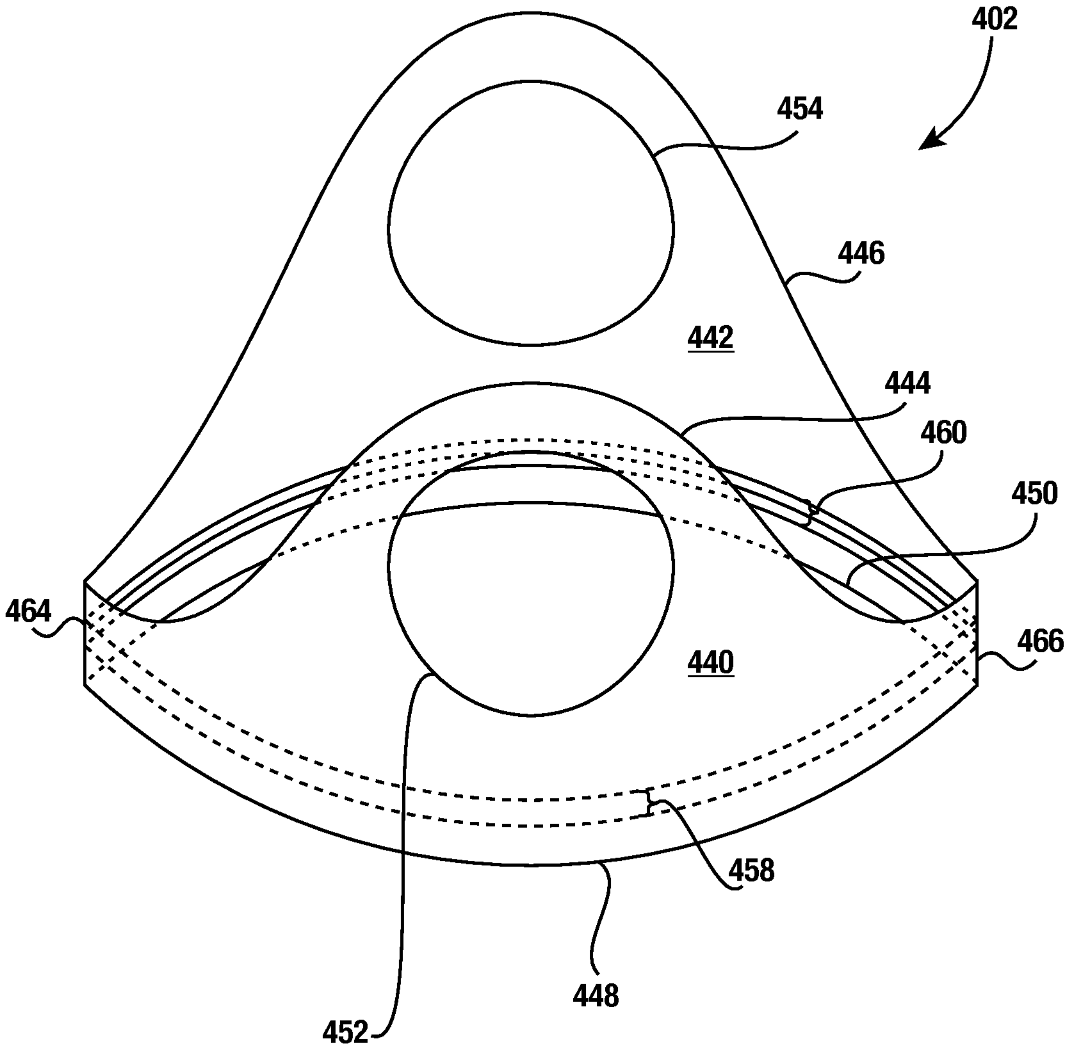

FIG. 10 provides a top perspective view of a handle of the reclosable bag of the embodiment of FIGS. 7 and 8.

Figure 11:
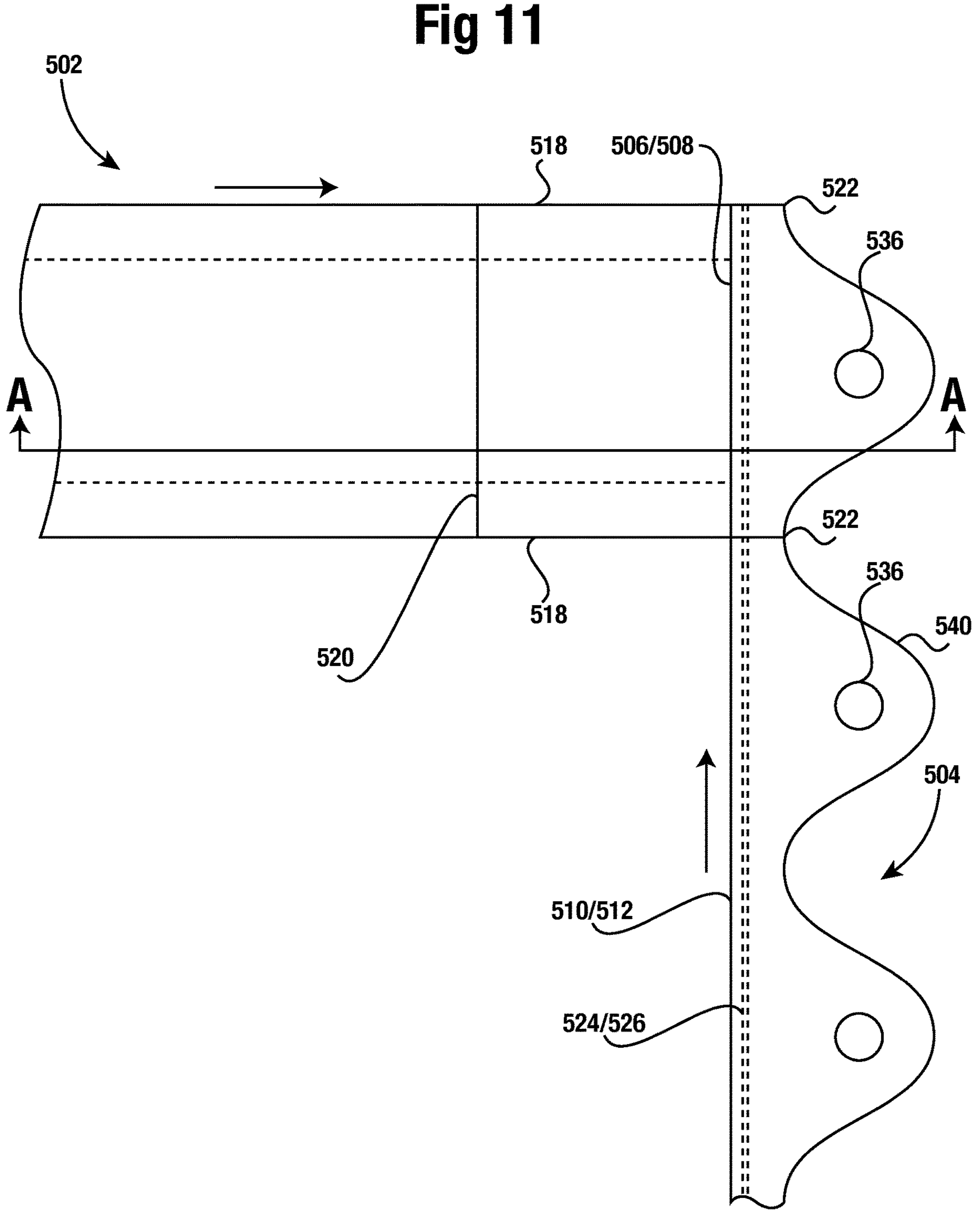

FIG. 11 provides a top plan view illustrating a method to form the bag of the embodiment of FIGS. 7 and 8.

Figure 12:
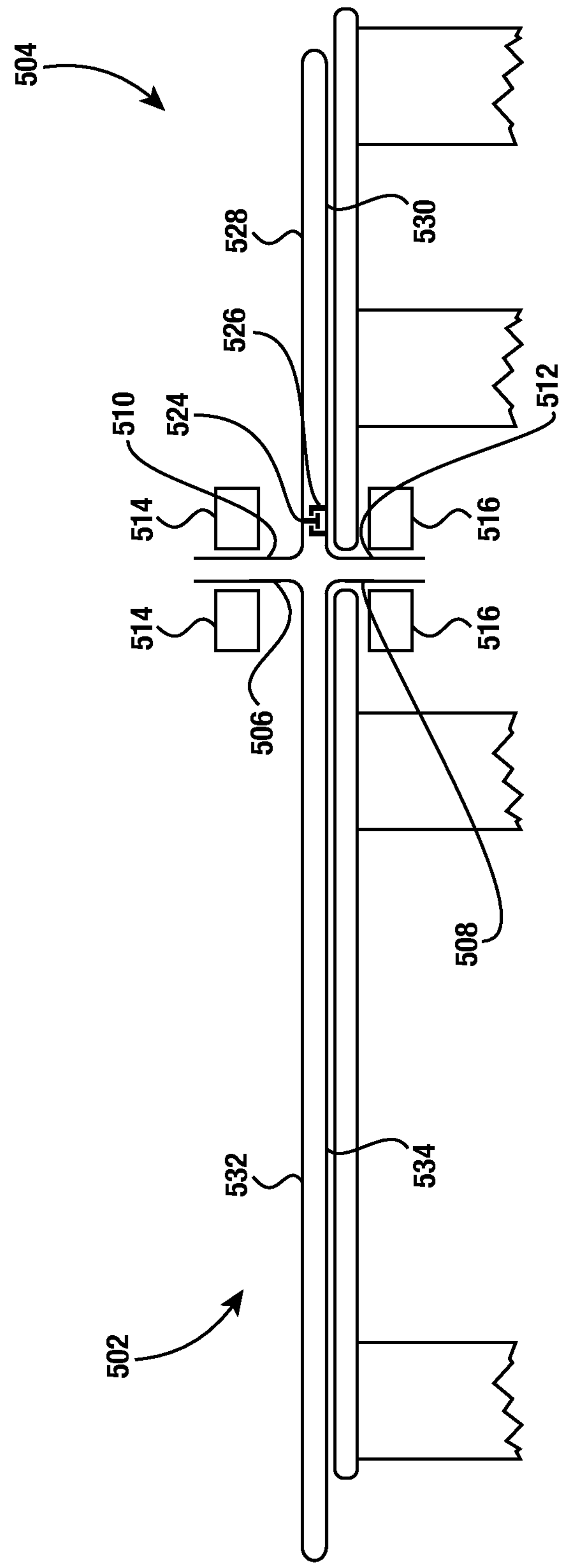

FIG. 12 provides a cross-sectional view taken along A-A of FIG. 11 showing a step of the method illustrated in FIG. 11.

DETAILED DESCRIPTION OF THE INVENTION

The present disclosure illustrates one or more preferred embodiments of the present invention. It is not intended to provide an illustration or encompass all embodiments contemplated by the present invention. In view of the disclosure of the present invention contained herein, a person having ordinary skill in the art will recognize that innumerable modifications and insubstantial changes may be incorporated or otherwise included within the present invention without diverging from the spirit of the invention. Therefore, it is understood that the present invention is not limited to those embodiments disclosed herein. The appended claims are intended to more fully and accurately encompass the invention to the fullest extent possible, but it is fully appreciated that certain limitations on the use of particular terms is not intended to conclusively limit the scope of protection.

The bag 100 is shown having a first panel 102 and a second panel 104. The two panels 102 and 104 are joined together at a first side 106 by first seal 107, at a second side 108 by a second seal 109, and at a bottom edge 110. The first panel 102 and second panel 104 may be formed from a single piece of polymeric film which is folded to define the bottom edge 110. A first top edge 112 and second top edge 114 are shown defined at an upper distal end of the first panel 102 and the second panel 104 respectively. Each top edge 112 and 114 may be in the form of a wave-shaped profile to form lobe 116 and 118 in each bag panel 102 and 104. Lobe 116 and 118 each comprise one period of the wave-shaped profile such that a width of bag 100 from the first side 106 to the second side 108 is one wavelength of the wave-shaped profile. The wave-shaped profile may comprise a sinusoidal wave shape but other wave-shaped profiles are also contemplated by the invention.

As further shown in FIGS. 1 and 2, below top edges 112 and 114 are handle openings 124 and 126. The handle openings 124 and 126 are shown positioned vertically between a peak and base (i.e. lowest point) of the wave-shaped profile within each lobe 116 and 118. The handle openings 124 and 126 are further shown positioned horizontally midway between opposing bases of the wave-shaped profile. Due to the symmetry of bag 100, handle openings 124 and 126 are also shown equidistant from first and second sides 106 and 108. Also shown in FIGS. 1 and 2 is each opening 124 and 126 having a generally circular shape.

Looking again at FIGS. 1 and 2, a first closure element 120 is shown disposed on an interior surface of the first panel 102 and a second closure element 122 is shown disposed on an interior surface of the second panel 104. Both the first and second closure elements 120 and 122 are shown extending from the first side 106 to the second side 108 of bag 100. The first and second closure elements 120 and 122 may be configured to engage with each other for closing bag 100 below the closure elements 120 and 122. In a preferred embodiment, closure elements 120 and 122 may be affixed to bag 100 by one or more heat seals with each heat seal extending in a lengthwise direction of closure elements 120 and 122. In an alternative embodiment, closure elements 120 and 122 may be affixed to bag 100 by a pressure sensitive adhesive. Further shown in FIGS. 1 and 2 is a gusset 128 formed in a bottom portion of bag 100.

The dimensions of polymeric bag 100 may vary but in one particular embodiment a width of bag 100, from the first side edge 106 to the second side edge 108 may be about 10-14 inches. A height of bag 100 from bottom edge 100 to closure elements 120 and 122 may be about 8-14 inches. A height of each bag 100 handle from a base to a peak of the wave-shaped profile may be about 4-8 inches. A total of height of bag 100 from the bottom edge 110 to a peak of the wave-shaped profile may be about 12-20 inches. A thickness of the polymeric film of bag 100 may also vary but in particular embodiments may range from about 0.4 mils to 4 mils. The diameter of each handle opening 124 and 126 may also vary but in certain embodiments of bag 100 it may be about 2.5-5 inches.

Shown in FIGS. 3 and 4 is a collapsed polymeric tube 300 utilized in a process for forming bag 100. Collapsed polymeric tube 300 may be formed from a polymeric film tube by a blown film extrusion process. As shown in FIG. 4, the collapsed polymeric tube comprises a front side 318 and a rear side 320. The collapsed polymeric tube 300 has a machine direction extending in the direction of extrusion which may also be referred to as a lengthwise direction of the polymeric film tube. The direction perpendicular to the machine direction of the polymeric film tube is commonly referred to as the cross-direction. Prior to the collapsing of the polymeric film tube, continuous gusset lines 308 and 310 may be formed in the polymeric film tube as shown in FIGS. 3 and 4, as is known in the art.

The polymeric resin used in the blown film extrusion process may vary. However, for forming polymeric bags, a polyethylene resin is commonly used. In the current state of the art for polymeric bags, a blend of various polyethylene polymers may be used. A polymer blend can have linear low-density polyethylene (LLDPE) or high-density polyethylene (HDPE) as the primary component. Other polymers may be utilized such as low-density polyethylene (LDPE). The polymer blend may include additives including, but not limited to, coloring additives, anti-blocking agents, and/or odor control additives. The film utilized to form polymeric bags may also comprise multiple layers of blown film resin. The resultant multi-layer film may be formed by co-extrusion, a lamination process, or other methods of forming a multi-layer film known in the art. In each layer, one or more of the above-discussed polymers may be used.

As further shown in FIGS. 3 and 4, once the polymeric film tube is collapsed, the collapsed tube 300 is longitudinally severed in the shape of a repeating waveform pattern 306 by a slitting operation. In at least one embodiment, as shown by FIGS. 3 and 4, the waveform 306 is sinusoidal. The slitting operation severs both the front side 318 and rear side 320 of the collapsed tube 300. The waveform 306 is shown centered between a first side edge 302 and a second side edge 304 of the collapsed tube 300 so that once severed, the collapsed tube is divided into two equal sections, a first tube section 314 and a second tube section 316 such that both sections have a repeating waveform pattern at an open top edge of each tube section 314 and 316.

Once the collapsed tube 300 is severed with waveform 306, circular openings 322 may be punched or otherwise formed in collapsed tube 300. In an alternative embodiment, circular openings 322 may be formed in collapsed tube 300 prior to the slitting operation. Each circular opening 322 is shown located about a centerline of collapsed tube 300 and also aligned in a machine direction of the collapsed tube at each peak of waveform 306. Once circular openings 322 are placed in the collapsed tube 300, first and second tube sections 314 and 316 may be separated from each other for further conversion into polymeric bags.

Shown in FIG. 5 is a cross-section of first tube section 314 which comprises front section 340 and rear section 342. Second tube section 316 may be manufactured in a likewise manner as first tube section 314 and hence is not discussed further. As shown by FIG. 5, first tube section 314 may be partially open by a bag converting process so that distal edges of front section 340 and rear section 342 are separated from each other. Once the distal edges of front and rear sections 340 and 342 are separated, first and second continuous closure elements 344 and 346 may be placed on interior surfaces of front and rear sections 340 and 342 of first tube section 314. Closure application guides **348*a* and 348*b* may be used to place continuous closure elements 344 and 346 onto front and rear sections 340 and 342 of first tube section 314**.

As further shown in FIG. 5, once continuous closure elements 344 and 346 are placed on front and rear sections 340 and 342 of the first tube section 314, sealing mechanisms **350*a* and 350*b* may seal the continuous closure elements onto the front and rear sections 340 and 342. In at least one preferred embodiment, continuous closure elements 344 and 346 may be sealed onto the front and rear sections 340 and 342 by heat sealing. In another alternative embodiment, continuous closure elements 344 and 346 may be affixed to front and rear sections 340 and 342 with a pressure sensitive adhesive. Once continuous closure elements 344 and 346 are affixed to the first tube section 314, the distal edges of front and rear sections 340 and 342 may be brought back towards each other and closure elements 344 and 346 may be mutually engaged so that bag first tube section 314** is fully closed.

Continuous closure elements 344 and 346 may be press and close type closure elements with one of the closure elements a female closure element and the other of the closure elements a male closure element as is known in the art. One particular example of female and male closure elements is disclosed in United States Pat. Appl. Publ. No. US2011/0311167A1 (the '167 publication) which is hereby incorporated by reference. FIG. 2 of the '167 publication discloses a first male closure element 200 and a first female closure element 220. Another example of male and female closure elements also shown in FIG. 2 of the '167 publication are second male closure element 240 and second female closure element 260. In one particular embodiment of the present invention, it may be desirable for continuous closure elements 344 and 346 to be similar to the second male and female closure elements 240 and 260 of the '167 publication since the asymmetric shape of the male closure element 240 provides for a higher interior opening force in comparison to an exterior opening force, as explained in the '167 publication.

In one particular embodiment of the present invention, continuous closure elements 344 and 346 may be manufactured separately from the collapsed tube 300 and provided as roll stock, or in other various bulk forms, for application to each tube section 314 and 316. In an alternative embodiment, continuous closure elements 344 and 346 may be manufactured in-line with the contemplated manufacturing process of the present invention and formed in-line prior to application to each tube section 314 and 316.

Shown in FIG. 6*a* is first tube section 314 with continuous closure elements 344 and 346 applied to front and rear sections 340 and 342 of the first tube section 314. Front and rear sections 340 and 342 are shown adjacent to each other and generally in the same plane. A plurality of closely spaced generally parallel sets of seals 366 are shown formed on the first tube section 314 by a bag converting process to form side seals for individual bags 100. Each set of seals 366 is shown placed at the base, i.e. the lowest points, of waveform 306 and extending in the cross-direction from the first side edge 302 to the upper edge waveform 306 of the first tube section 314.

As further shown in FIG. 6*a*, once the sets of seals 366 are formed, perforations 368*a* may be made in the first tube section 314 in between and parallel to each set of seals 366 to form individual bags 100. However, in at least one preferred embodiment, the first tube section 314 may be partially cut through with through-cut 368*b*. Through-cut 368*b* extends from waveform upper edge 306 to below continuous closure elements 344 and 346. Utilization of through-cut 368*b* in proximity to continuous closure elements 344 and 346 prevents continuous closure elements 344 and 346 from interfering with later separation of the perforation. The perforated tube section 314 may then be rolled for packaging or the perforated tube section 314 may further be separated into individual bags 100.

FIG. 6*b* illustrates an alternative embodiment from FIG. 6*a* of the process of forming first tube section 314 into individual bags 100. Rather than parallel seals and perforations, burn-through seal 370 is shown forming individual bags 100 from first tube section 314. Burn-through seal 370 is shown traversing first tube section 314 in the cross-direction at each base of wave-form profile 306 in place of the perforation 368 of the previous embodiment. Burn-through seals, or hot-knife edge seals, as known in the art, simultaneously seal adjoining layers of film together and cut through the layers—i.e. burn through. Thus, once burn-through seal 370 is applied to first tube section 314, first tube section 314 is separated into individual bags 100. Since burn-through seal 170 simultaneously seals and cuts, no closely spaced sets of seals 366 are necessary as described for the previous embodiment. The burn-through seal 370 forms opposing side seals such that first seal 107 is formed at first side 106 and second seal 109 is formed at second side 108 of bag 100 as shown in FIG. 6*b*. Once individual bags 100 are separated by burn-through seal 170, the bags may be stacked or otherwise arranged for packaging.

FIGS. 7 and 8 depict a further embodiment of the invention comprising a side-gusseted reclosable shopping or merchandise bag 400. The bag 400 shown comprises a handle 402 and bag body 404. In at least one embodiment, the handle section 402 may be formed from a first collapsed polymeric film tube and the bag body may be formed from a second collapsed polymeric film tube.

As more clearly shown in FIG. 9, the bag body 404, shown with its upper opening expanded, includes a front panel 406 and an opposing rear panel 408. Prior to collapsing of the second polymeric film tube that may form bag body 404; the tube may be inwardly gusseted on both opposing sides. Thus, the bag body 404 may include opposing inwardly folded side gussets 410 and 412 on a first side 414 and a corresponding opposing second side 416 of the bag body 404. The bag body 404 is further shown having a top edge 422 of front panel 406 and a top edge 424 of rear panel 408. Shown between the front panel 406 and the rear panel 408 of bag body 404 is a first side gusset panel along the first side 414 and an opposing second side gusset panel along the second side 416. Shown opposite top edges 422 and 424 is bag bottom 420 which forms a closed end of bag body 404. In at least one preferred embodiment, bag bottom 420 may be formed by heat sealing.

As shown in FIG. 10, handle 402 of bag 400 includes a front handle portion 440 and a rear handle portion 442. Also shown are front and rear upper edges 444 and 446 of handle portions 440 and 442, which may have a wave-shaped profile. The wave-shaped profile of the front and rear upper edges 444 and 446 may be a sinusoid or other various repeating waveforms.

As best shown in FIG. 10, handle 402 includes a bottom edge 448 opposite from top edge 444 of front handle portion 440 and a bottom edge 450 opposite from top edge 446 of rear handle portion 442. The wave-shaped profile of upper edges 444 and 446 of handle portions 440 and 442 may define a lobe in each handle portion. Each lobe comprises one period of the wave-shaped profile such that a width of handle 402 is one wavelength of the wave-shaped profile.

As further shown in FIG. 10, defined within each lobe of handle portions 440 and 442 are a front handle opening 452 in front handle portion 440 and a rear handle opening 454 in rear handle portion 442. The handle openings 452 and 454 are shown positioned vertically between a peak and base (i.e. lowest point) of the wave-shaped profile within each lobe. The handle openings 452 and 454 are further shown positioned horizontally midway between opposing bases of the wave-shaped profile. Also shown in FIGS. 7 and 10 are side edges 464 and 466 on opposing sides of handle 400 with handle portions 440 and 442 sealed or otherwise joined to each other along side edges 464 and 466.

Handle 402, as shown in FIG. 10, further includes a front closure element 458 disposed on an interior surface of front handle portion 440 and a rear closure element 460 disposed on an interior surface of the rear handle portion 442. Both the front and rear closure elements 458 and 460 are shown extending from the first side 454 to the second side 456 of handle 402. The front and rear closure elements 458 and 460 may be configured to engage with each other for closing bag 400 below the closure elements 458 and 460 with handle 402 attached to bag body 400. In a preferred embodiment, closure elements 458 and 460 may be affixed to handle 402 by one or more heat seals with each heat seal extending in a lengthwise direction of closure elements 458 and 460. In an alternative embodiment, closure elements 458 and 460 may be affixed to handle 402 by a pressure sensitive adhesive.

Now returning to FIGS. 7 and 8, handle 402 is affixed to bag 400 with a front handle seal 461 and rear handle seal 462. Front handle seal 461 is shown sealing together the front handle portion 440 to the front panel 406, the front handle seal 461 extending from the first side 414 to the second side 416 of bag 400. In a likewise fashion, rear handle seal 462 is shown sealing together the rear handle portion 442 to the rear panel 408, the rear handle seal 462 extending from the first side 414 to the second side 416 of bag 400. In at least one preferred embodiment, front handle seal 461 and rear handle seal 462 are formed by heat sealing. However, in at least one alternative embodiment, a pressure sensitive adhesive may be used rather than heat to form seals 461 and 462.

As further shown in FIGS. 7 and 8, front handle seal 461 may close off or seal together side gussets 410 and 412. Seal 461 is shown sealing off side gussets 410 and 412 in a straight line fashion with side gussets 410 and 412 extending linearly from bag bottom 420 and forming generally a perpendicular intersection with seal 461. In an alternative embodiment, side gussets 410 and 412 may taper at an angle towards seal 461 so that bag body 404 is provided with a greater amount of usable internal volume.

The dimensions of polymeric bag 400 may vary but in one particular embodiment a width of bag 400, from the first side 414 to the second side 416, may be about 6-14 inches. A height of bag 400 from bottom 420 to closure elements 458 and 460 may be about 8-14 inches. A height of each bag handle 402 from a base to a peak of the wave-shaped profile may be about 4-8 inches. A total of height of bag 400 from the bottom 420 to a peak of the wave-shaped profile may be about 12-20 inches. A thickness of the polymeric film of bag 400 may also vary but in particular embodiments may range from about 0.4 mils to 4 mils. The diameter of each handle opening 452 and 454 may also vary but in certain embodiments of bag 400 it may be about 2.5-5 inches.

Shown in FIGS. 11 and 12 is a depiction of a method of forming bag 400 from a side-gusseted collapsed blown film tube 502 and a partial wave-cut collapsed blown film tube 504. Partial wave-cut tube 504 may be formed in a similar process as described above for the formation of first and second tube sections 314 and 316 as shown in FIGS. 3 and 4, with partial wave-cut tube 504 comprising one of the tube sections 314 and 316. However, the width of collapsed tube 300 may be adjusted accordingly to form the appropriate height and width for handle 402 formed from partial wave-cut tube 504. Furthermore, the adjoining side edge of partial wave-cut tube, first or second side edges 302 and 304 of collapsed tube 300, may be slit so that front side 528 and rear side 530 of partial wave-cut tube 504 are detached from each other as shown in FIG. 12. The partial wave-cut tube 504 is shown with a first machine direction.

As further shown in FIGS. 11 and 12, continuous closure elements 524 and 526 may be affixed to interior surfaces of the front side 528 and the rear side 530 of partial wave-cut tube 504. The application of continuous closure elements 524 and 526 may be performed in a likewise manner as the application of continuous closure elements 344 and 346 previously described and illustrated in FIG. 5. Continuous closure elements 524 and 526 may also be of the same or similar structure as the previously described continuous closure elements 344 and 346.

Further shown in FIGS. 11 and 12 is a side-gusseted blown film tube 502 which may be formed utilizing various methods commonly known in the art. Side-gusseted tube 502 may be formed in a one-up process with a single side-gusseted tube formed from a single collapsed tube of blown film or multiple side-gusseted tubes may also be formed from a single blown film collapsed tube with the use of slit seals. Side-gusseted tube 502 is further shown having a front side 532 and rear side 534 in FIG. 12.

Side-gusseted tube 502 is shown in FIG. 11 having a second machine direction perpendicular to the first machine direction of partial wave-cut tube 504. The side-gusseted tube 502 intersects with the partial wave-cut tube 504 such that the leading distal edges of side-gusseted tube 502, upper edges 506 and 508, are in proximity with outer side edges 510 and 512 of partial wave-cut tube 504. The waveform, or wave-shaped profile 540, of the partial wave-cut tube 504 is formed so that each base of the waveform is aligned with a side edge 518 of side-gusseted tube 502 and a peak of the waveform is centered between a pair of opposing side edges 518. Additionally, aligned with each peak of the waveform 540 is a circular opening 536 defined between each pair of bases of the waveform of partial wave-cut tube 504.

FIG. 12 shows a cross-sectional view of side-gusseted tube 502 and partial wave-cut tube 504. Further shown in FIG. 12 is a front side upper edge 506 of gusseted-tube 502 and a front side outer edge 510 of a front section of partial wave-cut tube 504 folded upwards. Also shown are a rear side upper edge 508 of gusseted tube 502 and a rear side outer edge 512 of wave-cut tube 504 folded downwards. Prior to folding, the opposing side edges 518 of side-gusseted tube 502 may be slit a limited distance below upper edges 506 and 508 so that the upper edges may be folded away from each other as described.

Once edges 506 and 510 are folded upwards, the two films of the side-gusseted tube 502 and partial wave-cut tube 504 may be sealed to each other with sealing mechanism 514. In a likewise fashion, edges 508 and 512 may be sealed to each other with sealing mechanism 516. Simultaneously with the sealing of the upper and outer edges, the slit portions of side edges 518 may be resealed. Also, preferably simultaneously with the sealing of the upper and outer edges 506, 508, 510, and 512, hot-knife seals can be placed transversely across side-gusseted tube 502 to form bottom edge 420 of bag 400 and also at opposing sides 522 of handle portion 520 of partial wave-cut tube 504 to form fully sealed side edges 464 and 466 of bag 400. The hot knife seals can seal the adjoining films together and simultaneously sever the film.

Along with the sealing of the edges and sides, closure elements 524 and 526 may be crushed together, or ultrasonically welded, adjacent to sides 522 to ensure proper sealing and operation of closure elements 524 and 526. Once bag 400 is completely formed, it can be severed from tubes 502 and 504, preferably by the previously described hot-knife seals. Once separated from tubes 502 and 504, bag 400 may be packaged or otherwise processed further.

As previously noted, the specific embodiments depicted herein are not intended to limit the scope of the present invention. Indeed, it is contemplated that any number of different embodiments may be utilized without diverging from the spirit of the invention. Therefore, the appended claims are intended to more fully encompass the full scope of the present invention.

I claim:

1. A method of forming a bag from polymeric blown film, the method comprising:

forming a side-gusseted tube with a first machine direction, the side-gusseted tube having front and rear sides, the front and rear sides each having a distal edge, forming a partial wave-cut tube with a second machine direction, the partial wave-cut tube having front and rear sides, the front and rear sides each having a first side edge with a wave-cut profile and an opposing second side edge, affixing the front side of the side-gusseted tube to the front side of the partial wave-cut tube along the front side distal edge and the front side second edge, affixing the rear side of the side-gusseted tube to the rear side of the partial wave-cut tube along the rear side distal edge and the rear side second edge, forming a bottom seal in the side-gusseted tube to define a bag bottom, affixing a first closure element to an interior of the front side of the partial wave-cut tube, affixing a second closure element to an interior of the rear side of the partial wave-cut tube, the first and second closure elements affixed to the partial wave-cut tube by heat seals, the second side edges of the partial wave-cut tube extending generally linearly in the second machine direction, the first machine direction arranged generally perpendicular to the second machine direction, and the bottom seal generally perpendicular to the first machine direction.

2. The method of claim 1 wherein:

the front side of the side-gusseted tube is affixed to the front side of the partial wave-cut tube with a heat seal, and the rear side of the side-gusseted tube is affixed to the rear side of the partial wave-cut tube with a heat seal.

3. The method of claim 2 further comprising:

the side-gusseted tube intersecting with the partial wave-cut tube, placing a pair of side seals in the partial wave-cut tube, the pair of side seals generally perpendicular to the second machine direction, severing the bag from the side-gusseted tube along the bag bottom, and severing the bag from the partial wave-cut tube along the pair of side seals.

4. The method of claim 3 further comprising:

the side-gusseted tube having a pair of inwardly folded opposing side gussets between the front side and rear side.

5. The method of claim 4 further comprising:

a pair of hand openings defined between opposing bases of the wave-cut profile, the front and rear panels of the partial wave-cut tube each having one of the pair of the hand openings, and the pair of side seals placed at the opposing bases of the wave-cut profile.

6. The method of claim 5 further comprising:

the first and second closure elements comprising interlocking male and female closure elements.

7. A method of forming a bag from polymeric blown film, the method comprising:

forming a side-gusseted tube with a first machine direction, the side-gusseted tube having front and rear sides, the front and rear sides each having a distal edge, forming a partial wave-cut tube with a second machine direction, the partial wave-cut tube having front and rear sides, the front and rear sides each having a first side edge with a wave-cut profile and an opposing second side edge, affixing the front side of the side-gusseted tube to the front side of the partial wave-cut tube along the front side distal edge and the front side second edge, affixing the rear side of the side-gusseted tube to the rear side of the partial wave-cut tube along the rear side distal edge and the rear side second edge, forming a bottom seal in the side-gusseted tube to define a bag bottom, affixing a first closure element to an interior of the front side of the partial wave-cut tube, affixing a second closure element to an interior of the rear side of the partial wave-cut tube, and the first and second closure elements affixed to the partial wave-cut tube by an adhesive.

8. The method of claim 7 further comprising:

the second side edges of the partial wave-cut tube extending generally linearly in the second machine direction, the first machine direction arranged generally perpendicular to the second machine direction, and the bottom seal generally perpendicular to the first machine direction.

9. The method of claim 8 wherein:

the front side of the side-gusseted tube is affixed to the front side of the partial wave-cut tube with a heat seal, and the rear side of the side-gusseted tube is affixed to the rear side of the partial wave-cut tube with a heat seal.

10. The method of claim 9 further comprising:

the side-gusseted tube intersecting with the partial wave-cut tube, placing a pair of side seals in the partial wave-cut tube, the pair of side seals generally perpendicular to the second machine direction, severing the bag from the side-gusseted tube along the bag bottom, and severing the bag from the partial wave-cut tube along the pair of side seals.

11. The method of claim 10 further comprising:

the side-gusseted tube having a pair of inwardly folded opposing side gussets between the front side and rear side.

12. The method of claim 11 further comprising:

a pair of hand openings defined between opposing bases of the wave-cut profile, the front and rear panels of the partial wave-cut tube each having one of the pair of the hand openings, and the pair of side seals placed at the opposing bases of the wave-cut profile.

13. The method of claim 12 further comprising:

the first and second closure elements comprising interlocking male and female closure elements.

14. A method of forming a bag from polymeric blown film, the method comprising:

forming a side-gusseted tube with a first machine direction, the side-gusseted tube having front and rear sides, the front and rear sides each having a distal edge, forming a partial wave-cut tube with a second machine direction, the partial wave-cut tube having front and rear sides, the front and rear sides each having a first side edge with a wave-cut profile and an opposing second side edge, affixing the front side of the side-gusseted tube to the front side of the partial wave-cut tube along the front side distal edge and the front side second edge, affixing the rear side of the side-gusseted tube to the rear side of the partial wave-cut tube along the rear side distal edge and the rear side second edge, forming a bottom seal in the side-gusseted tube to define a bag bottom, affixing a first closure element to an interior of the front side of the partial wave-cut tube, the first closure element affixed in proximity to the second side edge, the first closure element extending generally in the second machine direction, and affixing a second closure element to an interior of the rear side of the partial wave-cut tube, the second closure element affixed in proximity to the second side edge, the second closure element extending generally in the second machine direction.

15. The method of claim 14 further comprising:

the second side edges of the partial wave-cut tube extending generally linearly in the second machine direction, the first machine direction arranged generally perpendicular to the second machine direction, and the bottom seal generally perpendicular to the first machine direction.

16. The method of claim 14 wherein:

the front side of the side-gusseted tube is affixed to the front side of the partial wave-cut tube with a heat seal, the rear side of the side-gusseted tube is affixed to the rear side of the partial wave-cut tube with a heat seal, and the first and second closure elements are affixed to the partial wave-cut tube with heat seals.

17. The method of claim 14 further comprising:

the side-gusseted tube intersecting with the partial wave-cut tube, placing a pair of side seals in the partial wave-cut tube, the pair of side seals generally perpendicular to the second machine direction, severing the bag from the side-gusseted tube along the bag bottom, severing the bag from the partial wave-cut tube along the pair of side seals, and the side-gusseted tube having a pair of inwardly folded opposing side gussets between the front side and rear side.

18. The method of claim 14 further comprising:

a pair of hand openings defined between opposing bases of the wave-cut profile, the front and rear panels of the partial wave-cut tube each having one of the pair of the hand openings, placing a pair of side seals in the partial wave-cut tube, the pair of side seals generally perpendicular to the second machine direction, and the pair of side seals placed at the opposing bases of the wave-cut profile.

19. The method of claim 18 further comprising:

the first and second closure elements comprising interlocking male and female closure elements.

* * * * *